UNITED STATES PATENT OFFICE.

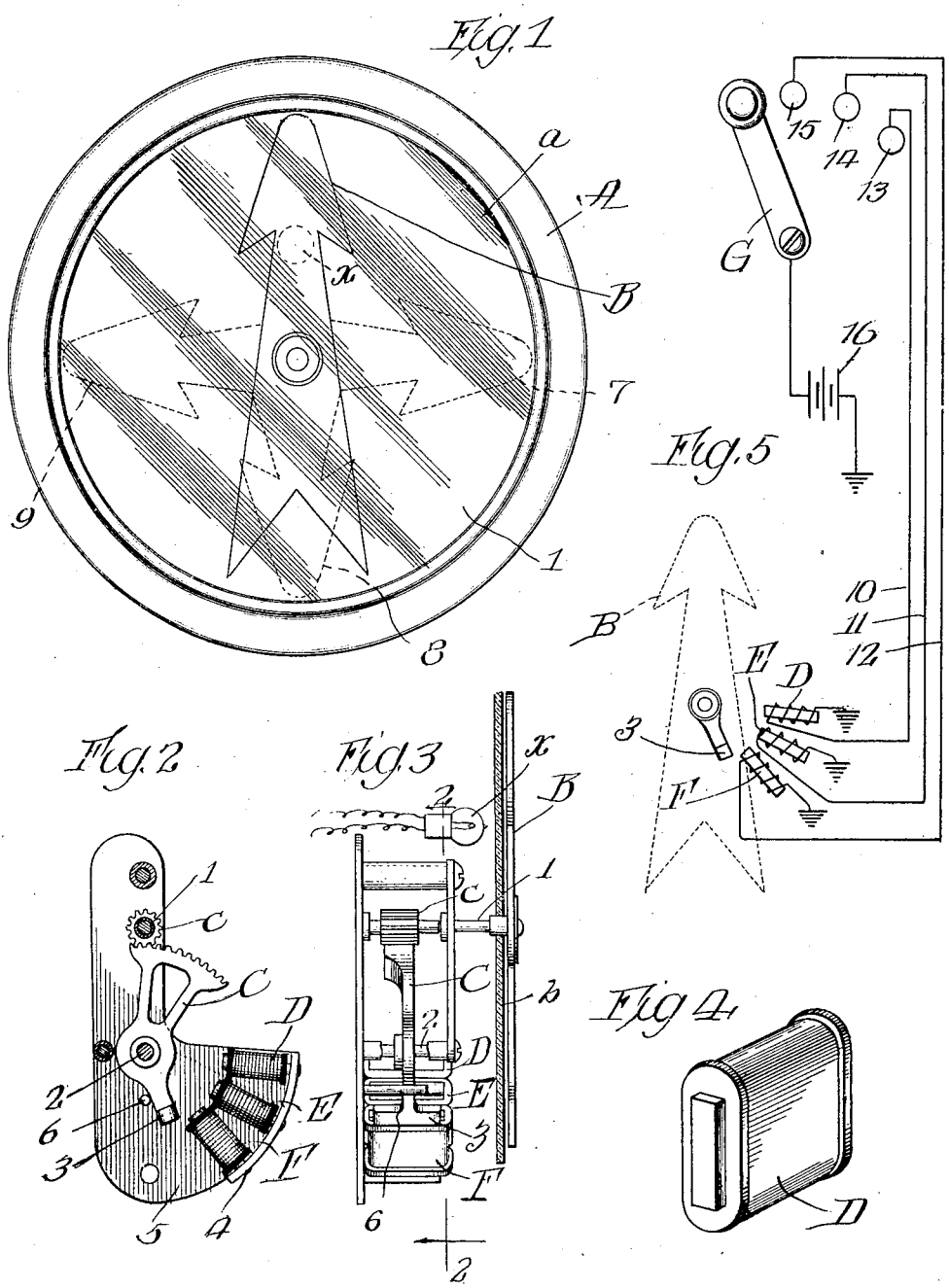

THOMAS B. WRIGHT, OF CHICAGO, ILLINOIS, ASSIGNOR TO THE WRIGHT TRAFFIC SIGNAL COMPANY, OF CHICAGO, ILLINOIS, A CORPORATION OF ILLINOIS.

DIRECTION-INDICATING DEVICE.

1,342,788.  Specification of Letters Patent.  Patented June 8, 1920.

Application filed May 14, 1917. Serial No. 168.328.

*To all whom it may concern:*

Be it known that I, THOMAS B. WRIGHT, a citizen of the United States of America, and resident of Chicago, Cook county, Illinois, have invented a certain new and useful Improvement in Direction-Indicating Devices, of which the following is a specification.

My invention relates to devices for indicating the direction of travel for an automobile or other vehicle.

This is an improvement on or modification of the indicator shown and described in my prior Patent No. 1,263,983, issued April 23, 1918, and involves the same general arrangement of a red arrow or movable indicator which shows red against a white or light or other contrasting background in daytime as well as at night.

The object of my invention is to provide a device of this kind which can be controlled electrically by switching devices arranged within reach of the driver of the vehicle.

It is also an object to provide certain details and features of construction and combinations tending to increase the general efficiency and desirability of an electrically-controlled direction-indicator of this particular character.

To the foregoing and other useful ends, my invention consists in matters hereinafter set forth and claimed.

In the accompanying drawings:—

Figure 1 is a front elevation of a direction-indicator embodying the principles of my invention.

Fig. 2 is a detail section on line 2—2 in Fig. 3.

Fig. 3 is a side elevation of the mechanism of said indicator.

Fig. 4 is a perspective of one of the magnets of said mechanism.

Fig. 5 is a diagram of the circuits of said mechanism.

As thus illustrated, my invention comprises a casing A provided with a glass front $a$ behind which is located the indicating element B, which latter is in the form of a rotary pointer. In practice, a transparent or translucent plate of glass $b$ is disposed behind this pointer, and the casing contains an electric lamp X, so that the device can be illuminated at night, thereby causing the pointer to appear dark on a light or luminous background. Also within the casing, there is an oscillating segment C which engages the pinion $c$ on the shaft 1 of said pointer B, whereby the latter is rotated when the rack is oscillated. This rack oscillates about its axis 2, and has its hub provided with a depending portion 3 which serves as a moving armature for the three electro-magnets D, E and F, which latter are preferably flattened (see Fig. 4) so that they may be arranged closely together, and have their outer ends secured to the flange 4 of the frame 5 upon which said mechanism is mounted within the casing of the instrument. A stop 6 limits the return movement of the arm 3, which latter by its own weight will gravitate into normal position to normally hold the pointer in the position shown in full lines in Fig. 1, which position indicates that the automobile or other vehicle is running straight ahead. When the armature is attracted by the magnet F, the pointer then assumes the position indicated in dotted lines at 7 in Fig. 1, which means that the machine is going to turn to the right. When the armature 3 is attracted by the magnet E, then the pointer assumes the position indicated in dotted lines at 8 in Fig. 1, thereby indicating that the automobile will stop. When the armature 3 is attracted by the magnet D, the pointer is rotated until it assumes the position indicated in dotted lines at 9 in Fig. 1, thus indicating that the automobile will turn to the left.

Any suitable arrangement can be employed for controlling the energizing of said magnets. For example, the circuit arrangement shown in Fig. 5 may be employed for this purpose, which involves the connection by the wires 10, 11 and 12 of the magnets D, E and F, respectively, with the contacts 13, 14 and 15 of a hand-switch arranged within reach of the driver of the automobile, the other terminals of said magnets being connected to ground in the manner indicated, so that they are all practically tied to the grounded pole of the battery 16, which latter may be a storage battery or a group of dry cells or any other source of current. The other pole of this battery is connected to the movable switch-member G, the latter being adapted to coöperate with the switch-contacts 13, 14 and 15 to close the circuits of said magnets. When this member G is swung into engagement with the contact 15, a circuit is closed from said battery through the magnet F, thus causing the latter to attract the armature 3, with the result previously described. In a similar way, the member G, which can be of brass, or any other metal, when brought into engagement with the contacts 14 or 13 will close the circuits of the magnets E or D, with the results previously explained. Of course, in order to energize the magnet E, the magnet F must first be energized, and in order to energize the magnet D the magnets F and E must first be energized, so that the armature 3 is moved forward step by step, so to speak, until it reaches the desired position. In returning the member G from the contact 13 to normal position, the series of magnets will be energized one after the other in reverse order, so that the armature 3 will be pulled back to normal position. Of course, from its position in front of the magnet F to its normal position (see Fig. 2) said armature will move simply by gravity, the pointer B being of very light material and balanced on its axis, so that very little power is required to operate the mechanism.

With this arrangement, the indicator can be mounted at the rear of the automobile, so that it will be within plain sight of those traveling in other vehicles behind, and the driver of the automobile, by manipulating the switch-member G, can control the indicator to indicate whether the automobile will turn to the right or the left, or whether it is the intention to stop. With the arrow B made of red celluloid, or other translucent material, the device will show a red light at night, and will then serve also as a tail light. In this way a red arrow is visible both day and night.

The rotary indicator B is preferably arrow-shaped or at least of arrow-like form, and is of sufficient size to enable it to serve as the tail light at night, in the manner explained. Also, as shown and described, the rotary indicator has a plurality of positions including a first position in which the arrow points upward to indicate that the automobile or other vehicle is traveling straight ahead, a second position in which the arrow points horizontally to the right to indicate turning in this direction, a third position in which the arrow points downward to indicate stopping of the vehicle, and a fourth position in which the arrow points horizontally to the left to indicate turning in this direction. With the construction employed, the operation is preferably such that the indicator can only reach the third position by passing through the second position, and can only reach the fourth position by passing through the second and third positions, by rotation in one direction, and the indicator is then automatically rotated in the opposite direction to return it from the fourth position to the first or normal position. If the first position be omitted, then the position in which the arrow points horizontally to the right will form the first position, and the position in which the arrow points downward will form the second position, while the third position will be the one in which the arrow points to the left. One or more of the positions can be omitted, of course, but preferably there are at least four positions to indicate different things, as explained.

What I claim as my invention is:—

1. In electrically operated and lighted apparatus for the purpose set forth, a movable indicator of red translucent material to serve both as a direction indicator and tail light for automobiles, a background for said indicator, a lamp behind said background, so that the indicator will appear red against a contrasting background in day time and also at night, means to support said background and indicator in front of said lamp, electrically-operated mechanism to operate said indicator, and circuit-controlling devices to control the operation of said mechanism, said indicator being arrow-like in form and of sufficient size to serve as the tail light at night.

2. The said structure, as specified in claim 1, in which said mechanism includes means for rotating said arrow to three positions, towit:—one position to indicate that the vehicle will turn to the right, a second position to indicate that the vehicle will stop, and a third position to indicate that the vehicle will turn to the left.

3. The said structure, as specified in claim 1, in which said mechanism and devices are electrically connected for causing said arrow to assume different positions, towit:—one position in which the arrow points horizontally to the right to indicate that the vehicle will turn to the right, a second position in which the arrow points downward to indicate that the vehicle will stop, and a third position in which the arrow points horizontally to the left to indicate that the vehicle will turn to the left, and means whereby the arrow can only reach the third position by passing through the first and second positions.

4. In a direction indicator, a pointer having a normal upright position and three other positions, towit: one position pointing horizontally to the right to indicate turning in this direction, a second position pointing downward to indicate stoppage, and a third position pointing to the left to indicate turning in this direction, in combination with means to electrically shift the pointer to any position, and means whereby the pointer can only reach the third position by passing through the first and second positions; and means whereby the pointer shows red against a light background in day time, and at night.

5. In an automobile direction indicator, the combination of a rotary arrow-like indicator having a plurality of positions including (1) a normal position in which the arrow points upward to indicate that the automobile is traveling forward (2) a horizontal position in which the arrow points to the right to indicate turning of the vehicle in this direction; (3) a vertical position in which the arrow points downward to indicate stopping of the vehicle; and (4) a horizontal position in which the arrow points to the left to indicate turning in this direction, electrically operated and manually controlled instrumentalities for causing the rotation of said indicator to its different positions, an electric lamp to illuminate said indicator at night, and means in front of said lamp to form a contrasting surface around the indicator, so that a red arrow-like indicator will be visible against a light background in daytime and at night, said indicator being of red translucent material and of sufficient size to serve as a tail light at night.

6. In an automobile direction indicator, the combination of a rotary arrow-like indicator having a plurality of positions including (1) a normal position in which the arrow points upward to indicate that the automobile is traveling forward; (2) a horizontal position in which the arrow points to the right to indicate turning of the vehicle in this direction; (3) a vertical position in which the arrow points downward to indicate stopping of the vehicle; and (4) a horizontal position in which the arrow points to the left to indicate turning in this direction; electrically operated and manually controlled instrumentalities for causing the rotation of said indicator to its different positions, an electric lamp to illuminate said indicator at night, and means to form a contrasting surface around the indicator, said instrumentalities comprising devices whereby the arrow can only reach the fourth position by passing through the second and third positions, by rotation in one direction, and means to automatically return the arrow in the opposite direction to said normal or first position.

Signed by me at Chicago, Illinois, this 10th day of May, 1917.

THOMAS B. WRIGHT.